INVENTOR.
Dewane B. Simpson

Dec. 13, 1966  D. B. SIMPSON  3,291,026
COMBINATION AIR DISTRIBUTION AND STRUCTURAL
SUPPORT ASSEMBLY FOR HOUSING
Filed March 23, 1964  3 Sheets-Sheet 3

INVENTOR.
Dewane B. Simpson
BY
Hovey, Schmidt, Johnson & Hovey
ATTORNEYS.

United States Patent Office 3,291,026
Patented Dec. 13, 1966

3,291,026
COMBINATION AIR DISTRIBUTION AND STRUCTURAL SUPPORT ASSEMBLY FOR HOUSING
Dewane B. Simpson, Carrollton, Mo.
(2528 W. Hayward, Phoenix, Ariz.)
Filed Mar. 23, 1964, Ser. No. 353,848
11 Claims. (Cl. 98—10)

This invention relates to mobile house trailers, and more particularly, to an air distribution system for such a trailer.

The present invention provides enclosed, hollow structural members at the top and bottom of a house trailer and in fluid communication with the interior thereof for the circulation of currents of air through the trailer interior for the purpose of heating or cooling the same. The structural members at the top and bottom of the trailer housing define plenum chambers open throughout their interiors so that when the chambers are interconnected by a blower-type heating and cooling system, one of the chambers becomes pressurized to serve as the source of currents of air issuing into the trailer interior while the other chamber serves as a receiver for the air currents passing out of the trailer interior. The air is thus caused to circulate continuously and the trailer interior is adequately heated or cooled throughout.

Air distribution systems for conventional trailers do not utilize this circulation of air, but direct currents of air out of the trailer and into the atmosphere after the air has passed through the interior of the trailer itself. The present invention represents an improvement, therefore, over air distribution system of conventional trailers inasmuch as the system of the instant invention is more efficient and is less expensive to operate than that of conventional trailer equipment.

Furthermore, the present invention utilizes truss structure in the floor of the trailer which comprises an open framework so that the lower plenum chamber will be completely open throughout its interior and thus the lower chamber can be pressurized throughout for the uniform distribution of air into the interior of the trailer. Conventional trailer construction utilizes imperforate baffle-type structural members in the floor to provide structural rigidity and strength for the trailer, but these require that the lower chamber be partitioned, and as a result, air must pass along a serpentine path in order to reach all parts of the lower chamber. There will thus be no uniformity in the distribution of air into the interior of the trailer housing above the chamber and the heating and cooling effects of the air will be different at the various locations within the trailer.

It is, therefore, the primary object of this invention to provide a mobile house trailer having an improved air distribution system which permits continuous circulation of the heated or cooled air through the interior of the trailer without exhausting any of the air to the atmosphere to thereby provide efficient and economical means for heating or cooling the interior of the trailer.

Another object of the present invention is the provision of a trailer of the aforesaid character which utilizes completely enclosed, hollow structural members at the top and bottom of the trailer housing with the members being open throughout their interiors to provide upper and lower plenum chambers in fluid communication with the trailer housing whereby currents of air will uniformly flow through the trailer housing and between the chambers when one of the chambers is pressurized by a blower-type heating or cooling device, and the other chamber serves to receive the currents of air passing out of the trailer interior and toward the device.

Yet another object of the invention is the provision of a trailer of the type described which utilizes open framework trusses to provide structural rigidity and strength for the trailer at the bottom thereof, while at the same time permitting the lower plenum chamber to remain open substantially throughout its interior, whereby the structural integrity of the trailer is maintained and currents of air may be uniformly distributed into the interior of the trailer at various locations.

In the drawings:

FIG. 3 is a cross-sectional view taken along line 3—3 of FIG. 2; and

The present invention provides a mobile house trailer having improved air distribution means which include enclosed, hollow, upper and lower structural members open throughout their interiors and in fluid communication by means of vents with the interior of a trailer. A heating or cooling device of the blower-type connects the chambers so that the bottom chamber is pressurized to direct currents of air uniformly into the interior of the trailer, while the upper chamber serves to receive the air and direct it to the device itself. When a number of vents are used, the interior of the trailer housing is uniformly heated or cooled by virtue of the air currents being uniformly admitted to the trailer interior through the vents.

Open framework-type truss members form the base of the trailer and are disposed within the lower chamber so that the lower chamber will be open throughout its interior. The air in the lower chamber therefore, need not follow serpentine or circuitous paths as is required by air distribution systems of conventional house trailers.

Figure 2:
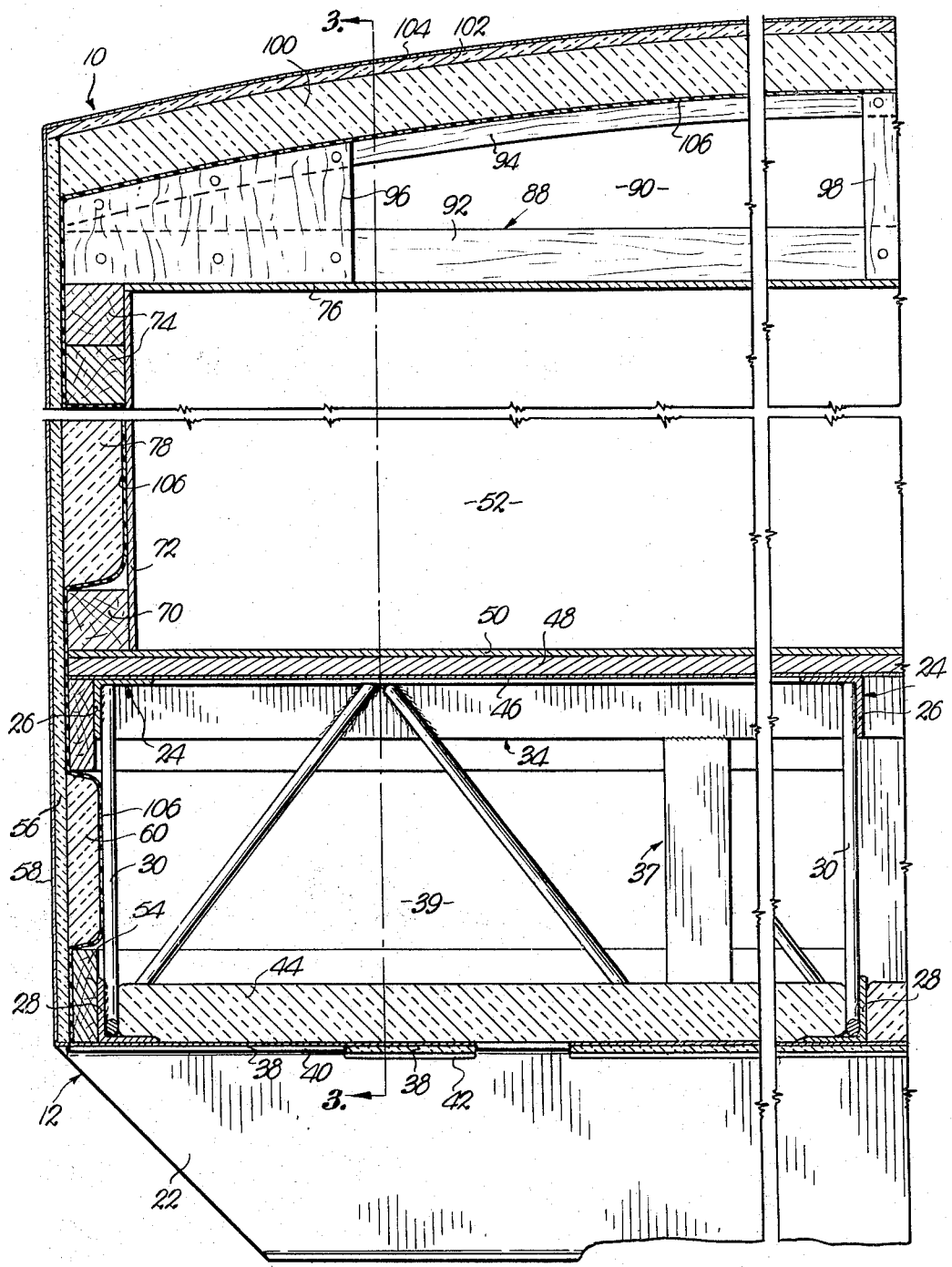
FIG. 2 is an enlarged, fragmentary, cross-sectional view of the trailer looking along the length thereof and illustrating its construction.

Mobile house trailer 10 used to illustrate the concepts of the present invention is of a box-frame construction as shown in FIGS. 2 and 3, but it is clear that it may be of any configuration without departing from the scope of the invention. Trailer 10 includes a base 12 having a running gear 14 which may be removable, and a tongue 16 provided with a hitch 18 for coupling the same to a towing vehicle. A vertically adjustable front gear 20 is coupled with tongue 16 to support the forward end of trailer 10 when the same is uncoupled from the towing vehicle.

Figure 4:
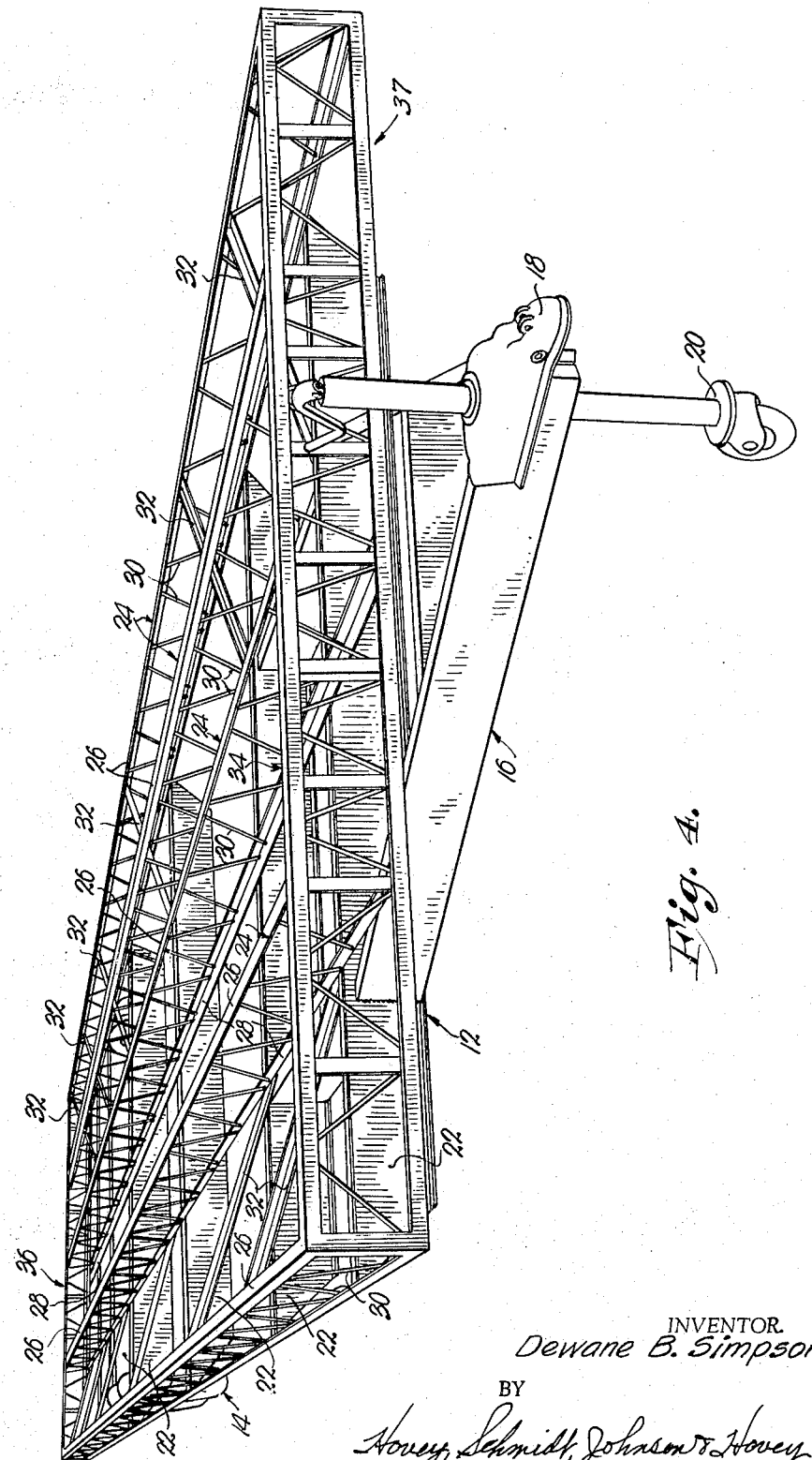
FIG. 4 is a perspective view of the base of the trailer showing the open framework-type truss members which permit the lower plenum chamber to be open throughout its interior while providing structural strength and rigidity for the trailer.

Base 12 includes a plurality of transversely extending I-beams 22 on which a number of longitudinally extending trusses 24 are disposed. Trusses 24 are of the open framework type including an upper beam 26 and a lower beam 28, beams 26 and 28 being of angle iron construction as shown in FIG. 2 and being interconnected by angularly disposed, spaced braces 30. Trusses 24 are rigidly secured to the upper flanges of I-beams 22 in any suitable manner, and tongue 16 projects forwardly from the forwardmost I-beam 22 as shown in FIG. 4. Inclined braces 32 extend inwardly and downwardly from the side trusses 24 to add structural rigidity to base 12.

Front and rear trusses 34 and 36 interconnect the respective front and rear ends of trusses 24 and extend in parallelism with I-beams 22. Trusses 34 and 36 are also open and are of substantially the same construction as trusses 24. Trusses 24, 34 and 36 define a hollow, structural member 37, which, when enclosed, defines a bottom plenum chamber 39 for trailer 10. The bottom of the aforesaid structural member 37 is closed by layers 38 of sheet metal which underlie and are secured to the corresponding upper flanges 40 of I-beams 22 as shown in FIG. 3. A layer 42 of undercoating material is disposed on the outer surface of layers 38 to protect the same against damage from corrosion.

A layer 44 of insulating material is disposed on layers 38. The upper surface of layer 44 forms the bottom of the plenum chamber 39 defined by the enclosed structural member 37. A layer 46 of sheet metal is disposed on the upper surfaces of trusses 24, 34 and 36 to cover the same. A bottom floor panel 48 and a top floor panel 50 overlie layer 46 and provide a floor for the interior 52 of trailer 10. Panels 48 and 50 may be of any suitable material and of any desired thickness. Bottom surface of layer 46 forms the upper boundary of the plenum chamber 39.

The sides of structural member 37 are enclosed by utilizing a pair of longitudinally extending, vertically spaced beams 54 secured to the outer surfaces of the side trusses 24 and a side panel 56 of insulating material, such as insulation board or the like. As illustrated in FIG. 2, panels 56 also serve to provide the siding for the portion of trailer 10 above base 12, in a manner hereinafter described. An outer layer 58 of any suitable material such as sheet aluminum or the like, covers panel 56 and provides the exterior for trailer 10. A layer 60 of insulating material is disposed between beams 54 and on the inner surface of panel 56.

Similarly, the ends of structural member 37 are closed by utilizing at each end a pair of beams 62, an upright panel 64 of insulating material, and an outer layer 66 of metallic sheet material as shown in FIG. 3. A layer 68 of insulation is disposed between beams 62 and on the inner surface of panel 64.

A pair of longitudinally extending stringers 70 rest on floor panel 50 and are adjacent the inner surfaces of panels 56. Stringers 70 extend along the length of trailer 10 and serve as a support for upright, inner side walls 72 defining the sides of interior 52. Longitudinally extending, juxtaposed plates 74 are disposed directly above each stringer 70 respectively, and serve to anchor the upper extremity of the corresponding side wall 72. A ceiling 76 of any suitable material such as Upsom board or the like, overlies interior 52 and is coupled with the upper extremities of side walls 72. A layer 78 of insulation is disposed between each stringer 70 and the lower of the two plates 74 thereabove. The ends of interior 52 are enclosed in the same way as the sides thereof and, as shown in FIG. 3, a stringer 80 and a plate 82 spaced vertically thereabove, provide support for an end wall 84 extending between floor panel 50 and ceiling 76. A layer 86 of insulation is disposed between stringer 80 and plate 82.

Ceiling 76 provides the bottom of a hollow, structural member 88 disposed above interior 52 and defining an upper, enclosed plenum chamber 90 open throughout its interior. Structural member 88 further includes a number of longitudinally spaced, transversely extending ceiling joists 92 which span the distance between the upper plates 74 at the sides of interior 52 as shown in FIG. 2. A curved arch 94 is provided with each joist 92 respectively, and is disposed in overlying relationship thereto as shown in FIGS. 2 and 3. A gusset 96 connects the proximal ends of joist 92 and arch 94, and upright supports 98 of any suitable material couple each joist 92 with its corresponding arch 94 at spaced locations therealong.

A layer 100 of insulation overlies chamber 90, and a panel 102 of any suitable material such as insulation board, overlies layer 100. A layer 104 of the same material as layer 58 overlies panel 102 to cover the same. By using joists 92 and arches 94, chamber 90 is open throughout its interior and air may flow substantially in all directions therewithin without being obstructed.

A vapor barrier 106 of any suitable material, such as an imperforate, flexible plastic, overlies chamber 90, extends along the sides and ends of chamber 39 as shown in FIGS. 2 and 3. Barrier 106 prevents the entrance of moisture or vapor into and the escape of moisture or vapor from trailer 10 so that uniform humidity conditions may be provided in interior 52 as desired.

Figure 1:
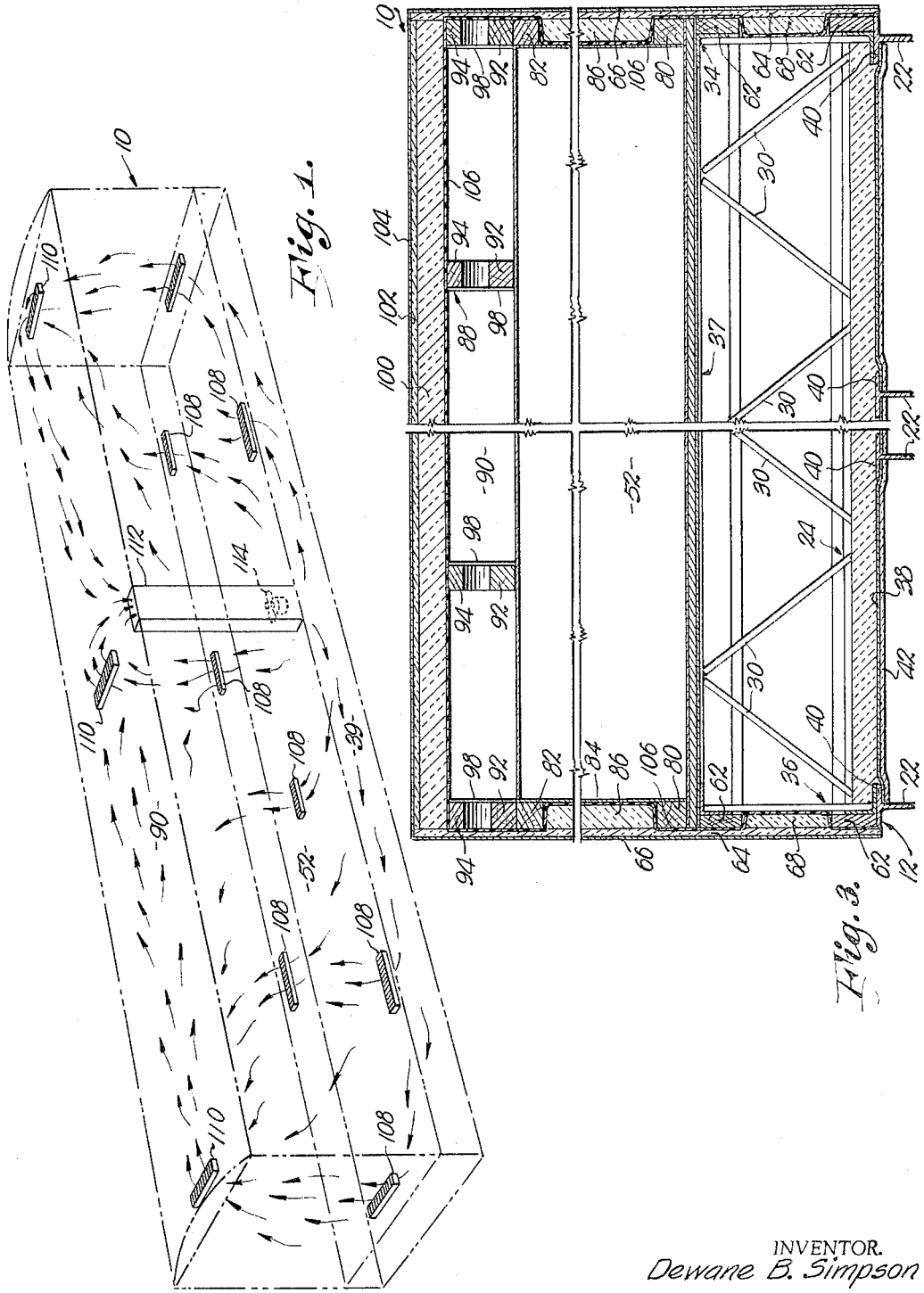
FIGURE 1 is a schematic view of the air distribution system of the present invention showing the upper and lower, enclosed plenum chambers open throughout their interiors and in fluid communication with the interior of a trailer, currents of air through the trailer and the chambers being denoted by arrows.

As shown in FIG. 1, a number of vents 108 are disposed between chamber 39 and interior 52 to place the latter in fluid communication with each other. Vents 108 may be formed in any suitable manner in layer 46 and panels 48 and 50. Similarly, a number of spaced vents 110 place interior 52 in fluid communication with chamber 90.

A conduit 112 is carried at any suitable location on trailer 10 and is disposed for placing chamber 90 in fluid communication with chamber 39. A heating or cooling device 114 of the blower-type, is disposed within conduit 112 so that chamber 39 may be pressurized to cause air to be forced into interior 52 through vents 108. Chamber 90 thus serves to receive air from interior 52 through vents 110 and to return the air to conduit 112. The directions of air flow into chambers 39 and 90 and interior 52 are shown by the arrows in FIG. 1.

In operation, device 114, which may either be a heater, a cooler, or a combination heater-cooler, is actuated so that conditioned air is directed into chamber 39 from the bottom end of conduit 112. Since chamber 39 is open throughout its interior, it will be uniformly pressurized and air currents will flow through vents 108 into interior 52 uniformly. Thus, all parts of trailer 10 may be uniformly affected by the heating or cooling effects of the air. A register can be employed on each vent 108 to control the amount of air passing therethrough.

The air flowing into interior 52 will pass out of the same through vents 110 into chamber 90. The air will ultimately pass into the open upper end of conduit 112 for return flow to device 114. A register may be provided for each vent 110 to control the flow of air therethrough. Since chamber 90 is open substantially throughout its interior, all parts of chamber 90 will be substantially at the same pressure and air will be drawn uniformly toward conduit 112.

The air flows created by the actuation of device 114 will be substantially continuous and circulatory through chambers 39 and 90 and interior 52 to effectively and uniformly heat or cool interior 52. Since neither chamber is open to the atmosphere, the heating or cooling of interior 52 will be highly efficient and there will be a minimum of loss to the atmosphere through the walls formed by the various parts of trailer 10.

By virtue of the aforesaid construction, no condensation forms on the wall surfaces defining chambers 39 and 90 and interior 52 inasmuch as the air movements prevent such formation of condensation. As a result of this, there is no necessity for air vents to the atmosphere. Even though air is directed into chamber 39 at one point, namely, the lower end of conduit 112, structural member 37 is large enough and open throughout its interior to equalize the pressure of the air therewithin so that the air will flow uniformly into interior 52.

The floor of trailer 10 defines the upper boundary of chamber 39. Hence, no additional sub-floor or other structure is required to provide the top of chamber 39. I-beams 22 serve as leveling supports and for coupling the running gear 14 to structural member 37. However, I-beams 22 may be eliminated if desired and running gear 14 may be coupled directly to structural member 37.

By using structural member 37, any type of tip-out or folding room may be attached thereto which also has a hollow base and which can communicate with the interior of structural member 37 to receive pressurized air from device 114. Thus, no additional heating system would be required for such a folding room since a single device 114 would be adequate.

Having thus described the invention, what is claimed as new and desired to be secured by Letters Patent is:

1. In a mobile trailer having running gear, hitch and a hollow, enclosed body provided with a top and a bottom, the combination with said body of:
   a first hollow member above the top of said body and presenting a first enclosed chamber, there being first vent means placing said first chamber in fluid communication with said body;
   a second hollow member below the bottom of said body and presenting a second enclosed chamber, there being second vent means placing said second chamber in fluid communication with said body, said second hollow member having an open framework therein maintaining said second chamber open throughout its interior, providing structural strength for said second member and supporting the latter and the body sufficiently to permit the trailer to be moved from place to place as an integral unit without substantial structural deterioration; and
   means extending between said members for placing said chambers in fluid communication with each other.

2. In a mobile trailer having running gear, hitch and a hollow, enclosed body provided with a top and a bottom, the combination with said body of:
   a first hollow member above the top of said body and presenting a first enclosed chamber, there being first vent means placing said first chamber in fluid communication with said body;
   a second hollow member below the bottom of said body and presenting a second enclosed chamber, there being second vent means placing said second chamber in fluid communication with said body, said second hollow member having an open framework therein maintaining said second chamber open throughout its interior, providing structural strength for said second member and supporting the latter and the body sufficiently to permit the trailer to be moved from place to place as an integral unit without substantial structural deterioration;
   conduit means extending between said members for placing said chambers in fluid communication with each other; and
   actuatable structure within said conduit means for drawing air out of one of said chambers and directing it to the other of said chambers, whereby a flow of air through said body is created when said structure is actuated.

3. In a mobile trailer as set forth in claim 2, said chambers being open throughout their interiors to permit substantially unrestricted movement of air therewithin.

4. In a mobile trailer as set forth in claim 2, said first chamber being in overlying relationship to substantially the entire area of said top, said second chamber being in underlying relationship to substantially the entire area of said bottom.

5. In a mobile trailer as set forth in claim 2, said body having a ceiling defining said top, said first member having wall means above said ceiling, said wall means and said ceiling defining said first chamber.

6. In a mobile trailer as set forth in claim 2, said body having a floor panel defining said bottom, said second member having wall means below said floor panel, said wall means and said floor panel defining said second chamber.

7. In a mobile trailer as set forth in claim 2, said first hollow member including a truss.

8. In a mobile trailer as set forth in claim 2, said first hollow member including a joist, an arch spaced from said joist, and a support having a width less than the lengths of said joist and said arch, said support interconnecting said joist and said arch.

9. In a mobile trailer having running gear, hitch and a hollow, enclosed body provided with a ceiling and a floor panel, the combination with said body of:
   a first hollow member mounted on said body above said ceiling and having first wall means thereon, said ceiling and said first wall means defining a first hollow chamber open throughout its interior to permit substantially unrestricted movement of air therewithin;
   a number of spaced, first vents in said ceiling for placing said first chamber in fluid commuication with the interior of said body;
   a second hollow member mounted on said body below said floor panel and having second wall means thereon, said floor panel and said second wall means defining a second, hollow chamber open throughout its interior to permit substantially unrestricted movement of air therewithin, said second hollow member having an open framework therein maintaining said second chamber open throughout its interior, providing structural strength for said second member and supporting the latter and the body sufficiently to permit the trailer to be moved from place to place as integral unit without substantial structural deterioration;
   a number of spaced, second vents in said floor panel for placing said second chamber in fluid communication with the interior of said body;
   conduit means spanning the distance between said ceiling and said floor panel for placing said first and second chambers in fluid communication with each other; and
   actuatable structure within said conduit means for drawing air out of said first chamber and directing it under pressure into said second chamber, whereby a flow of air through said body is created when said structure is actuated.

10. In a mobile trailer as set forth in claim 9, the framework in said second chamber including a longitudinally extending truss.

11. A mobile trailer comprising:
    a lower, generally rectangular assembly having a plurality of longitudinally spaced, laterally extending I-beams, a series of laterally spaced, longitudinally extending trusses on said I-beams, a plurality of inclined braces interconnecting certain of said trusses, and a pair of longitudinally spaced, laterally extending end trusses interconnecting the ends of said series of trusses;
    a floor mounted on said assembly above said trusses;
    running gear attached to said lower member for permitting said trailer to be moved from place to place;
    an upper, generally rectangular assembly, substantially parallel to and approximately coextensive in length and breadth with said lower member and having a plurality of longitudinally spaced, transversely extending ceiling joists, a series of curved arches corresponding to each joist in vertical spaced relationship thereto, and means for interconnecting said joists and said arches;
    a ceiling mounted on the upper assembly beneath said joists;
    side and end panels attached to said assemblies to form a trailer interior between said floor and said ceiling;
    means closing the bottom of said lower assembly;
    means closing the top of said upper assembly;
    said assemblies being hollow and comprising structural members, cooperating with said panels to withstand the stresses and strains of over-the-road transportation and to present upper and lower plenum chambers;

said floor having first vent means placing said interior into communication with said lower plenum chamber;

said ceiling having second vent means placing said interior into communication with said upper plenum chamber;

a conduit interconnecting said plenum chambers; and means in said conduit for drawing air from said upper chamber for flow through the conduit, into said lower chamber, through said first vent means, into said interior, and thence to the upper chamber through the second vent means.

References Cited by the Examiner

UNITED STATES PATENTS

| | | | |
|---|---|---|---|
| 2,127,095 | 8/1938 | Strong | 98—31 |
| 2,178,644 | 11/1939 | Piron | 98—10 |
| 2,476,435 | 7/1949 | Spencer | 98—10 |
| 2,569,910 | 10/1951 | Venuti. | |
| 2,595,613 | 5/1952 | Spencer | 98—10 |

MEYER PERLIN, *Primary Examiner.*